Figure 1:
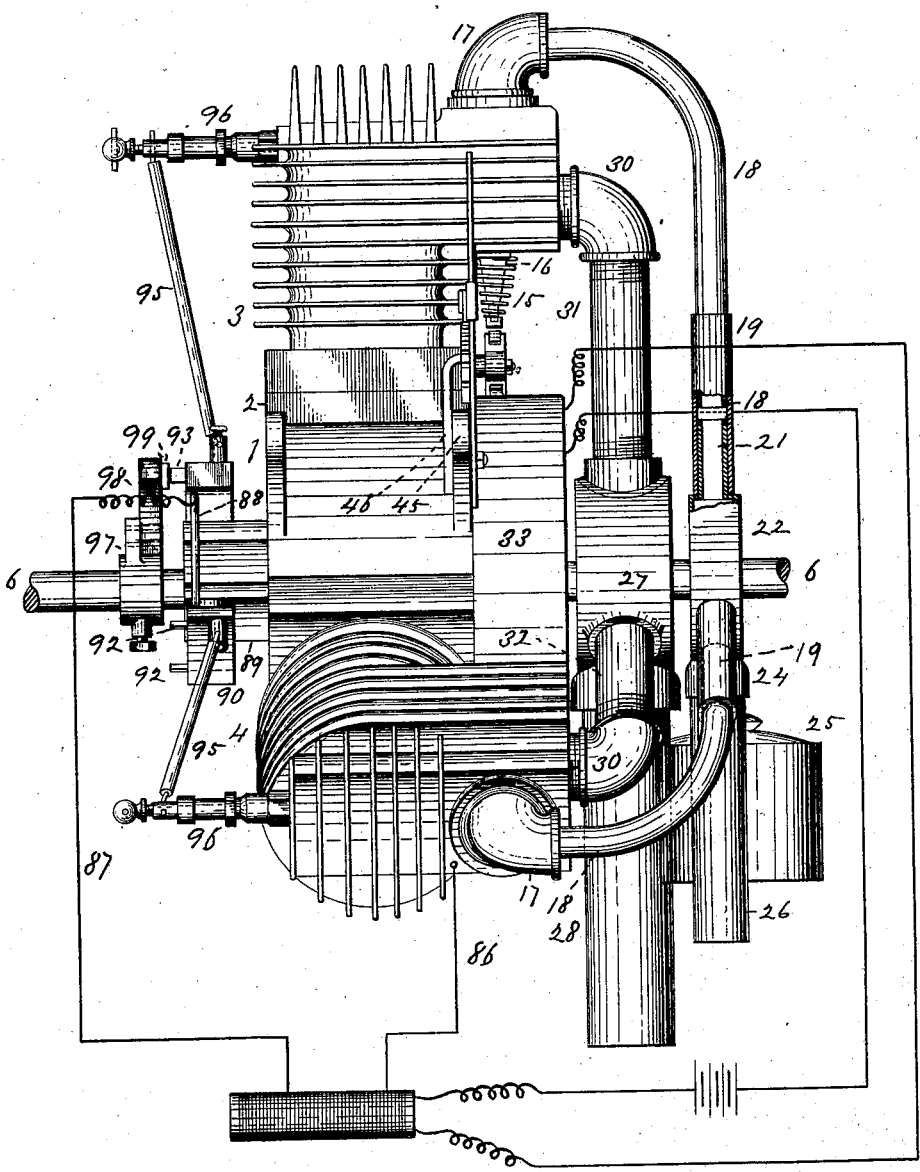

No. 734,562. PATENTED JULY 28, 1903.
W. H. JONES.
VALVE GEAR FOR EXPLOSIVE ENGINES.
APPLICATION FILED NOV. 3, 1902.
NO MODEL. 4 SHEETS—SHEET 1.

WITNESSES: INVENTOR:

No. 734,562. PATENTED JULY 28, 1903.
W. H. JONES.
VALVE GEAR FOR EXPLOSIVE ENGINES.
APPLICATION FILED NOV. 3, 1902.
NO MODEL. 4 SHEETS—SHEET 2.

WITNESSES:
A. N. Bonney.
A. K. Hood.

INVENTOR:
William H. Jones,
By his Att'y.
Henry W. Williams

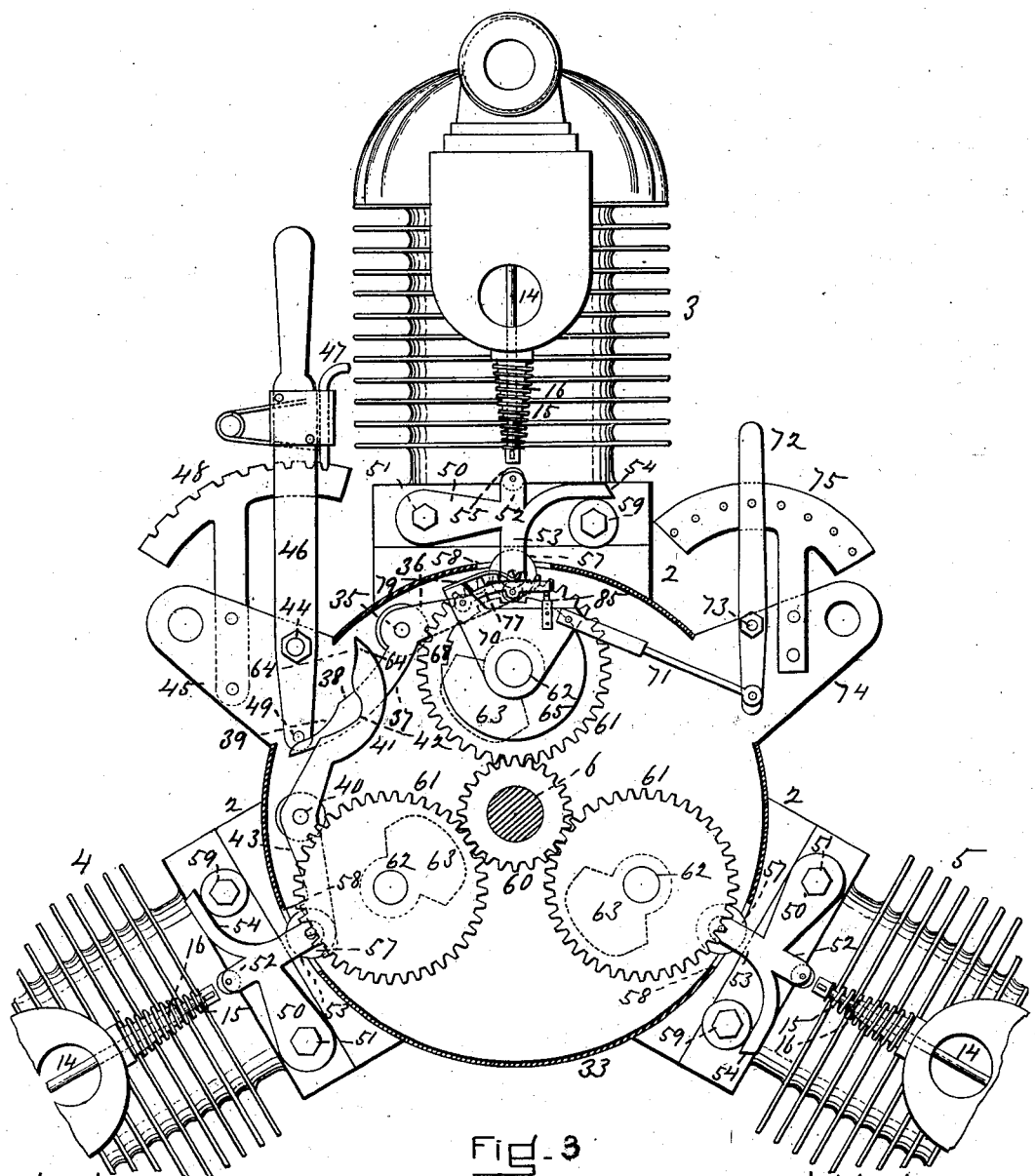

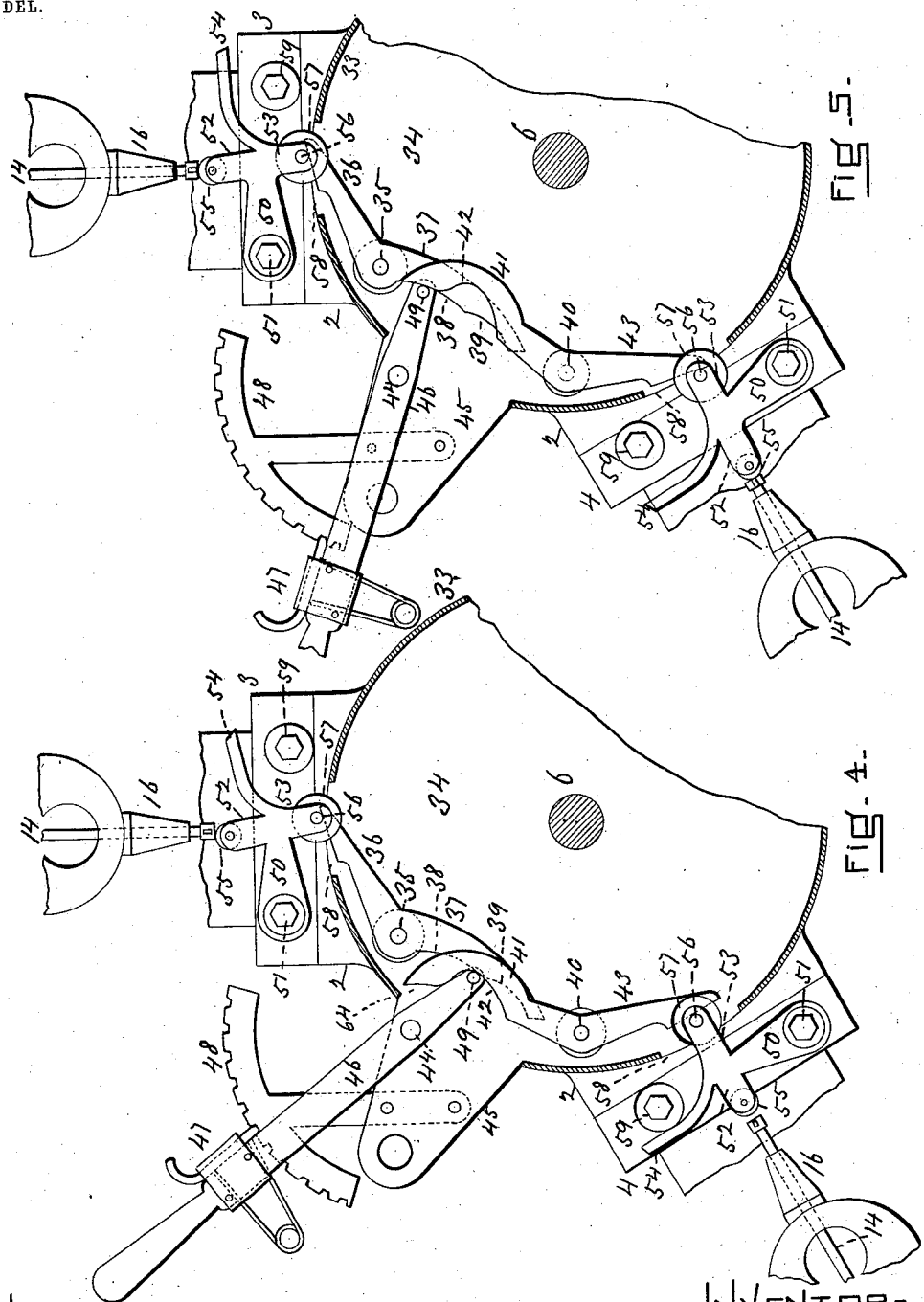

No. 734,562.

Patented July 28, 1903.

UNITED STATES PATENT OFFICE.

WILLIAM H. JONES, OF CAMBRIDGE, MASSACHUSETTS.

VALVE-GEAR FOR EXPLOSIVE-ENGINES.

SPECIFICATION forming part of Letters Patent No. 734,562, dated July 28, 1903.

Application filed November 3, 1902. Serial No. 129,843. (No model.)

*To all whom it may concern:*

Be it known that I, WILLIAM H. JONES, a citizen of the United States, residing in Cambridge, in the county of Middlesex and State of Massachusetts, have invented certain new and useful Improvements in Valve-Gear for Explosive-Engines, of which the following is a specification.

This invention relates to gas-engines in which the power results from a succession of explosions, and particularly that class of gas-engines of the so-called "four-cycle" type, in which the cylinder makes an explosion every second revolution. Moreover, the invention relates to that class of gas-engines in which there is a plurality of cylinders arranged with relation to the shaft in such a manner that the explosions therein take place consecutively and with great rapidity, whereby neutralization and practical absorption of the vibrations from the different cylinders is effected and a balanced motor is produced.

In the drawings I have illustrated my invention as applied to a gas-engine in which three cylinders are arranged radially around the shaft; but I do not confine myself to such an arrangement of cylinders.

My present invention relates particularly to an improved construction, arrangement, and mechanism comprising and including a system of levers and gears for controlling the action of the exhaust-valves, and thereby regulating the speed and power of the engine and improving its operation.

The nature of the invention is fully described below and illustrated in the accompanying drawings, in which—

Figure 2:
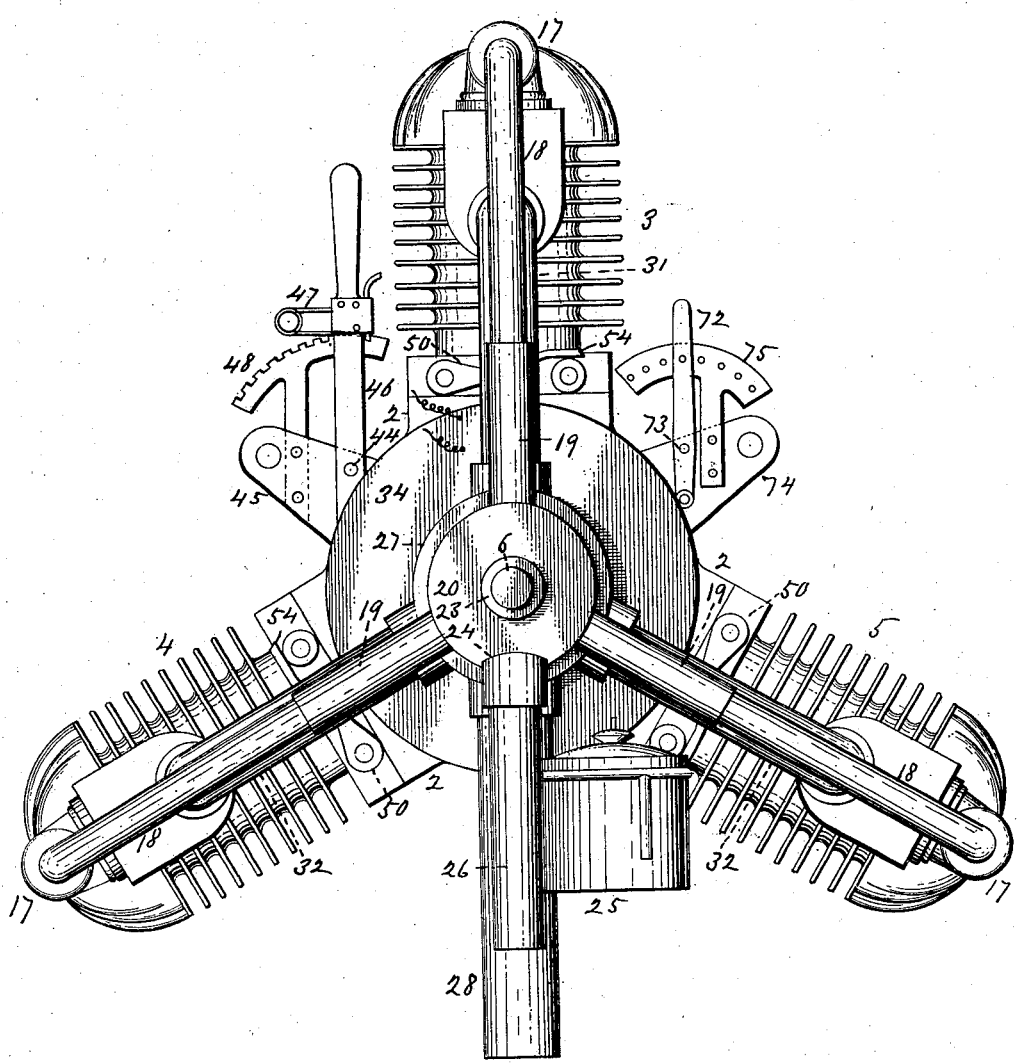

Figure 1 is a side elevation, looking from the left, of a gas-engine embodying my improvements, a small portion of one of the pipes being represented as broken out. Fig. 2 is a front elevation of the same. Fig. 3 is a sectional elevation taken through the case 33, illustrating the mechanisms for operating the exhaust-valves. Fig. 4 is a diagrammatic view illustrating the mechanism for operating the exhaust-valves and controlling the power. Fig. 5 is a similar view showing the parts in a different position.

Similar characters of reference indicate corresponding parts.

1, Fig. 1, represents a case provided with radial extensions 2 (in this instance three in number) for supporting the cylinders 3, 4, and 5, and mounted on this case is the crank-shaft 6. The cylinders are provided with ordinary pistons connected by connecting-rods with an ordinary crank, mounted on the crank-shaft 6 in the usual manner. The cylinders are exactly alike in construction, each being provided with an exhaust-valve, of which 15 represents the spring, and 16 the guide, for the valve-stem, Figs. 1 and 3. The intake-passage is connected by an elbow 17 and telescopic pipes 18, 19, and 21 with the peripheral wall 22, Fig. 1, of the distributing-box 20, Fig. 2, having an inner concentric wall 23, said box being sustained by the crank-shaft 6. This box is connected by a pipe 24 with the portion 26 of a carbureter 25. On the crank-shaft 6 is also a junction-box 27, which operates as a collector for the main exhaust-pipe 28 and connects, by means of the pipes 31 and 32 and the elbows 30, with the exhaust-ports 29. (Illustrated in Fig. 7.) The said parts 17 and 32, inclusive, are not claimed in this application, as their construction and arrangement are made the subject of a separate application filed January 6, 1903, Serial No. 138,027.

Cast on the crank-shaft case 1 is the gear-case 33. (See Figs. 1, 3, 4, and 5.) Referring particularly to Figs. 3, 4, and 5, in which the gear-case is shown in section, 34, Fig. 2, represents the front wall of the crank-shaft case, and pivotally supported by said wall are two levers. The lever which is fulcrumed on the pin 35 consists of the straight arm 36, and the arm 37, whose operative edge is formed with two curves 38 and 39. (Illustrated in full lines in Figs. 4 and 6 and in dotted lines in Fig. 5.) The other lever, which is fulcrumed on the pin 40, comprises an arm 41, which is formed with a deep curve at 42, and the straight arm 43. Pivoted at 44 to a bracket 45 on the case 1 is the controlling-lever 46, (which in practice extends up into the carriage,) said lever being held in any desired position by an ordinary locking contrivance 47 engaging with a segment 48. The lower end of this lever is provided with a suitable pin or roll 49, which extends across and into the path of the curved arms 37 and 41 of the said levers. Intermediate with the valve-stems 14 in the exhausts of two of the cylinders and the straight arms 36 and 43 of said levers are two levers similar in construction, each of which consists of the main portion 50, pivoted at 51 to a cylinder, the arms 52 and 53 extending oppositely therefrom at substantially right angles, and the forward extension 54. The arm 52 is preferably provided with a suitable roll 55, and the arm 53 is provided with a pin 56, which supports a roll 57. The pins 56 on the two levers are in the paths of the straight arms 36 and 43 of the levers above described, and the case 33 is provided with suitable openings 58 for the accommodation of the mechanism. In the paths of the ends 54 of the lever 50 are bolts 59, which are secured to the cylinders and act as stops.

The ordinary method for operating the exhausts in the different cylinders is by means of the gear 60, which engages with the gears 61 on the studs 62, supported by the crank-shaft case, as shown in Fig. 4, said gears 61 carrying cams 63, which engage the rolls 57, supported by the two levers 50, and also the roll supported by the third lever 50, constructed exactly the same and connected with the third cylinder, all as illustrated in Fig. 4. This mechanism 60 61 62 is not new in this invention and needs no further description except so far as to mention that it operates, by means of the rolls 57 and the levers 50, the stems 14 of the exhaust-valves in the ordinary manner.

It will be noticed that in Figs. 4, 5, and 6 the controlling-lever 46 is shown in three positions. In Fig. 4 the controller is vertical and has no effect on either of the levers, which are fulcrumed at 35 and 40, and the machine is operating all three cylinders by means of the cam 62 and rolls 57 without being affected by the controlling-lever. When it is desired to slow down the machine, the controlling-lever 46 is moved from the position indicated in Fig. 4 to that indicated in Fig. 5. This operation moves the roll 49 at the end of the short arm along the curvature 39 on the arm 37 of the lever fulcrumed at 35. When this roll reaches the dividing-point between the curve 39 and the curve 38, the straight arm 36 of said lever has, by means of the pin 56, swung up the lever 50 into the position indicated in Fig. 5 and by means of the roll 55 has pushed up the valve-stem 14 slowly until the cylinder 3 has ceased to operate, for the reason that the exhaust-port is open to the atmosphere. The curve 39 is of such an arc and is so proportioned that the valve-stem is raised gradually, as above mentioned, and hence the power is reduced gradually and the speed reduced with corresponding slowness. In Fig. 6 the controlling-lever has been swung still farther from the position indicated in Fig. 5 for the purpose of putting another cylinder out of action. The pin 49, which only operated the lever 36 37 in Fig. 5, has traveled along the curve 38 on the lever 37 without further affecting the movement of the lever because this curvature is on an arc of a circle of which the pivot 44 is the center; but the pin which in Fig. 5 was at the bottom of the curve 42 of the lever fulcrumed at 40 has left that curvature and has moved toward the end of the lever, pushing down said end and resting in a short curvature 64, the curve thereof being on an arc of a circle of which the pivot 44 is the center. By this means the arm 43 operates on the lever 50 between said arm and the cylinder 4 in the same manner as the arm 36 operated on the lever 50 between that arm and the cylinder 3 and puts said cylinder gradually out of action. It should be added that the first part of the curve 42, which is traversed by the pin 49 at the same time that said pin is operating the arm 37 by means of its curve 39, is on an arc of a circle of which the pin 44 is the center, and hence the arm 41 of the lever pivoted at 40 is not affected until the pin 49 leaves the point indicated in Fig. 5 and begins to travel up a sharp rise of the curve 42 toward the point indicated in Fig. 6. Thus one cylinder after another is put out of action by the controlling-lever when it is desired to slow down the machine and regulate its speed, and the cylinders are successively put again into action by reversing the movement of the lever, for the reason that the springs 15 are constantly holding the valve-stems 14 into engagement with the roll 55 on the lever 50 until the exhaust-valve closes, when the arm 54 is brought down upon the stop 59.

Mounted on one of the cam-gears 61 is an insulating-disk provided with three peripheral notches, one of which is indicated by dotted lines at 68 in Fig. 3, and mounted on the stud 62 of this particular gear is a triangular bell-crank 70. (Indicated in full lines in the same figure and made of insulated material.) A rod 71 is pivotally connected at one end with a corner of the bell-crank and at its opposite end with an operating-lever 72, pivoted at 73 to a bracket 74, extending from the case 1. Secured to this bracket is a locking contrivance 75, whereby the lever 72 may be locked in any desired position. An arm 77 is held against the periphery of the disk by a spring 79. As the disk rotates with the gear 61 the arm will drop successively into the notches on its periphery, there being electrical connection whereby the circuit is open when the arm is in engagement with the periphery of the disk and closed when it is in one of the notches, the free end of the arm being then in contact with the point 85. A wire 86, Fig. 1, connects the metallic frame of the machine by a suitable battery, and a wire 87 leads therefrom to a wire 88, supported by and insulated from the three radial extensions 89 of the case 1. Blocks of insulation 90 are secured to the outer ends of the radial extensions and support pairs of brushes 92 and 93. The wire 88 is connected with one of each pair of brushes, while the other of each pair is connected by the protected electric wires 95 with the spark-plugs 96 in the different cylinders.

A short arm 97 is rigid on the crank-shaft 6, and its outer end is provided with a segmental disk 98, of insulating material, whose inner surface has a contact-plate 99, which comes successively into contact with the brushes during the rotation of the crank-shaft. As there is but one rotation of the gear 61, and hence but one of the insulation-disk 65, to two rotations of the gear 60 and as the notches are all located within one-half of the periphery of the disk, with every second revolution of the gear 60 there is electrical contact of all the pairs of brushes with the plate 99, and with every alternate revolution of the gear 60 there is non-electrical contact of the brushes with the plate. Hence as the sparks only pass with the electrical contact of the brushes, which occurs only when the arm 77 is in engagement with the notches on the wheel 65 and makes the primary circuit, the sparks pass only with every alternate rotation of the crank-shaft and gear 60 and during that cycle which includes the period of compression. These parts (numbered from 68 to 99, inclusive) form no portion of the invention as claimed in the present application, and hence need no further description.

Having thus fully described my invention, what I claim, and desire to secure by Letters Patent, is—

1. In a gas-engine of the character described, a cylinder provided with a suitable exhaust-port; an exhaust-valve and stem in said cylinder; a lever pivotally mounted on the machine within the gear-case, and comprising the substantially straight arm 36, and the arm 37 provided with the curved face 39; a controlling-lever pivotally supported by the machine and with its operating end engaging with the curved portion of said lever; and a lever intermediate with the straight arm 36 and the valve-stem, whereby motion is communicated from the straight arm of said lever to the valve-stem, substantially as described.

2. In a gas-engine of the character described, a cylinder provided with a suitable exhaust-port; an exhaust-valve and stem in said cylinder; a lever pivotally mounted on the machine within the gear-case, and comprising the substantially straight arm 36, and the arm 37 provided with the curved operative face 39, and with the curvature 38 describing an arc of a circle of which the pivot of the controlling-lever is the center; a controlling-lever pivotally supported by the machine and with its operating end adapted to engage with the curved face 39 and to move along the curvature 38; and a lever intermediate with the straight arm 36 and the valve-stem, whereby motion is communicated from said straight arm to said valve-stem, substantially as set forth.

3. In a gas-engine of the character described, a cylinder provided with a suitable exhaust-port; an exhaust-valve and stem in said cylinder; a lever pivotally mounted on the machine within the gear-case, and comprising the substantially straight arm 43, and the arm 41 provided on its face with the deep curved recess 42; a controlling-lever pivotally supported by the machine and with its operating end adapted to engage with the said recess on the lever; and a lever intermediate with the straight arm 43 and the valve-stem, whereby motion is communicated from said straight arm to said valve-stem, substantially as described.

4. In a gas-engine of the character described, a cylinder provided with a suitable exhaust-port; an exhaust-valve and stem in said cylinder; a lever pivotally mounted on the machine within the gear-case, and comprising the substantially straight arm 43, and the arm 41 provided on its face with the deep curved recess 42, and with the curvature 64 on its end, said curvature 64 being on an arc of a circle of which the pivot of the controlling-lever is the center; and a controlling-lever pivotally supported by the machine and with its operating end adapted to engage with said curved recess on the lever and to move along the curvature 64; and a lever intermediate with the straight arm 43 and the valve-stem, whereby motion is communicated from said straight arm to said valve-stem, substantially as set forth.

5. In a gas-engine of the character described, two cylinders provided with suitable exhaust-ports; exhaust-valves and stems in said cylinders; a lever pivotally mounted on the machine within the gear-case and comprising the substantially straight arm 36, and the arm 37 provided with the curved operative face 39, and the curvature 38 describing an arc of a circle of which the pivot of the controlling-lever is the center; a second lever pivotally mounted on the machine within the gear-case, and comprising the substantially straight arm 43, and the arm 41 provided with the deeply-curved operative face 42; a controlling-lever pivotally supported by the machine and with its operating end adapted to extend into and engage successively the said curved faces 39 and 42, and to move over the curvature 38 while it is in engagement with said curved face 42; and levers intermediate with the two straight arms 36 and 43 and the valve-stems of two cylinders, whereby motion is communicated from the arm 36 to its corresponding valve-stem, and from the arm 43 to its corresponding valve-stem, successively, substantially as described.

6. In a gas-engine of the character described, a cylinder provided with a suitable exhaust-port; an exhaust-valve and stem in said cylinder; a lever pivotally mounted on the machine within the gear-case; a controlling-lever pivotally supported by the machine, and adapted to engage with one arm of the lever mounted in the gear-case; the lever 50 pivoted to the cylinder, provided with the arm 52 adapted to engage with the valve-stem, with the arm 53 adapted to be engaged by the arm of the lever within the gear-case which is in engagement with the controlling-lever, and the arm 54; and a stop 59 on the cylinder, substantially as set forth.

In testimony whereof I have signed my name to this specification in the presence of two subscribing witnesses.

WILLIAM H. JONES.

Witnesses:
HENRY W. WILLIAMS,
A. N. BONNEY.